(12) United States Patent
Suzuki et al.

(10) Patent No.: US 8,142,724 B2
(45) Date of Patent: Mar. 27, 2012

(54) HYDROGEN SENSOR MOUNTING STRUCTURE FOR FUEL CELL VEHICLE

(75) Inventors: Akihiro Suzuki, Utsunomiya (JP); Takashi Sasaki, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1138 days.

(21) Appl. No.: 11/439,651

(22) Filed: May 24, 2006

(65) Prior Publication Data

US 2006/0269806 A1 Nov. 30, 2006

(30) Foreign Application Priority Data

May 26, 2005 (JP) .................................. 2005-153742

(51) Int. Cl.
*G01N 7/00* (2006.01)
(52) U.S. Cl. .............................. 422/83; 422/98; 73/23.2
(58) Field of Classification Search .................... 422/83, 422/98, 104; 429/22, 34; 73/23.2
See application file for complete search history.

(56) References Cited

FOREIGN PATENT DOCUMENTS

| JP | 2001-27626 | 1/2001 |
|---|---|---|
| JP | 2003-252252 | 9/2003 |
| JP | 2003-329631 | 11/2003 |
| JP | 2004-93473 | 3/2004 |
| JP | 2004-142588 | 5/2004 |
| JP | 2004-144564 | 5/2004 |
| JP | 2004-170294 | 6/2004 |

OTHER PUBLICATIONS

Chinese Office Action for Application No. 200610084412.3, dated Apr. 4, 2008.
Japanese Office Action for Application No. 2005-153742, dated Mar. 2, 2010.

*Primary Examiner* — Jill Warden
*Assistant Examiner* — Dwayne K Handy
(74) *Attorney, Agent, or Firm* — Nelson Mullins Riley & Scarborough LLP; Anthony A. Laurentano

(57) ABSTRACT

A hydrogen sensor mounting structure applicable to a fuel cell vehicle that includes a fuel cell system installed under a floor panel, and a hydrogen sensor located above the fuel cell system is provided. The floor panel includes a floor tunnel portion protruding into a cabin of the vehicle; the fuel cell system is located on an outer side of the floor tunnel portion; and the hydrogen sensor is mounted from an inner side of the cabin of the floor tunnel portion.

5 Claims, 3 Drawing Sheets

HYDROGEN SENSOR MOUNTING STRUCTURE FOR FUEL CELL VEHICLE

BACKGROUND OF THE INVENTION

1. Field of the Invention

The present invention relates to a hydrogen sensor mounting structure for use in a fuel cell vehicle, in which the hydrogen sensor is located above a fuel cell system installed under a floor panel.

This application claims priority on Japanese Patent Application No. 2005-153742 filed on May 26, 2005, and incorporates the content thereof herein in its entirety.

2. Description of Related Art

Fuel cell systems that can be incorporated in a fuel cell vehicle such as a fuel cell automobile include, for example, a system that supplies an oxidant gas to a cathode of the fuel cell while supplying a fuel gas to an anode of the fuel cell, to generate an output electric power through an electrochemical reaction of the gases.

With regard to vehicles with such a fuel cell, a technique for safety assurance is known, for example, for detecting that there is no leakage of hydrogen supplied to the fuel electrode of the fuel cell.

For example, referring to FIG. 4, a fuel cell vehicle 1 has a floor panel 5 with a central portion thereof protruding into the inside of a cabin, to thus form a center tunnel 6, and a technique is studied in which a hydrogen sensor 4 (see FIG. 5) is mounted above a piping/wire harness 3 running through the center tunnel.

In connection with this, Japanese Unexamined Patent Application, First Publication No. 2003-252252 proposes a technique of forming an additional protruding portion in an upper portion of the floor tunnel provided on the floor panel, which protrudes further toward the upper portion, for accommodating the hydrogen sensor in the protruding portion, and disposing the fuel cell unit and the piping under the hydrogen sensor, so as to prevent water or mud splashing up from the road from directly hitting the hydrogen sensor.

Such conventional techniques, however, have the following drawbacks.

Referring to FIG. 6, when the hydrogen sensor 4 is disposed under the center tunnel 6 (outside the cabin), not only a gap 1a for preventing interference by the center tunnel 6 with the fuel cell device 2 and the piping/wire harness 3 disposed under the center tunnel 6, but also a space for accommodating the hydrogen sensor 4, corresponding to the height 1b thereof, have to be taken into consideration when forming the center tunnel 6. This leads to an increase in the height required for the center tunnel 6, thus giving rise to restrictions in layout designing in a vertical space, for securing the necessary height.

Furthermore, when providing a protection cover (not shown, see FIG. 3) that protects a detecting portion 8 from flying stones or splashing water, because an entirety of the hydrogen sensor 4 is exposed outside the cabin, a space for attaching the cover that encloses the entire hydrogen sensor 4 has to be secured under the center tunnel 6, which also results in restriction of freedom in arranging the hydrogen sensor 4 and the protection cover.

In addition, as is apparent from FIG. 6, the detecting surface 8 of the hydrogen sensor 4 can only be located lower than the hydrogen sensor mounting position on the center tunnel 6 (ceiling portion of the center tunnel), at least by the height of the sensor main body 7 of the hydrogen sensor 4. Accordingly, even when hydrogen is present under the center tunnel 6, if the hydrogen is floating in an upper position (region A) than the detecting surface 8 of the hydrogen sensor 4 because of the lighter specific gravity of hydrogen, the hydrogen sensor 4 may not detect the hydrogen, which leads to degradation of detecting accuracy.

Furthermore, in the configuration of mounting the hydrogen sensor 4 under the center tunnel 6, the fuel cell device 2 and the piping/wire harness 3 located thereunder hinder the work of mounting the hydrogen sensor 4. In order to perform maintenance work for the hydrogen sensor 4 the fuel cell device 2 and the piping/wire harness 3 have to be removed, which complicates the work of removing and mounting the hydrogen sensor 4, thus imposing a heavier labor burden.

In view of the foregoing, it is an object of the present invention to provide a hydrogen sensor mounting structure for a fuel cell vehicle that offers higher layout designing freedom, prevents degradation of detecting accuracy, and allows easy removal and mounting of the hydrogen sensor.

SUMMARY OF THE INVENTION

The present invention provides a hydrogen sensor mounting structure applicable to a fuel cell vehicle that includes a fuel cell system installed under a floor panel and a hydrogen sensor located above the fuel cell system, wherein the floor panel includes a floor tunnel portion protruding into a cabin of the vehicle, such that the fuel cell system is located on an outer side of the cabin of the floor tunnel portion, and the hydrogen sensor is mounted from an inner side of the cabin of the floor tunnel portion.

It is preferable that the hydrogen sensor include a detecting surface, and the detecting surface be located at a level the same as or higher than an upper surface of the floor panel in the floor tunnel portion.

In addition, it is preferable that the hydrogen sensor include a detecting surface, and a protection cover that protects the detecting surface.

Furthermore, it is preferable that the protection cover include a mesh portion.

According to the present invention, the hydrogen sensor is mounted from the inner side of the cabin of the floor tunnel portion, which eliminates the need to take into account the height of the hydrogen sensor itself when designing the height of the floor tunnel portion, thereby allowing a reduction in the height of the floor tunnel portion and increasing the freedom in layout designing in a vertical space.

Also, it is not necessary to expose the main body of the hydrogen sensor outside the floor tunnel portion, and it is only the detecting portion of the hydrogen sensor that has to be exposed outside the cabin. Accordingly, when the protection cover is to be provided, it suffices for the protection cover to enclose only the detecting portion. Such a structure allows significant reduction of the space to be secured, thus increasing the freedom in disposing the hydrogen sensor and the protection cover.

Furthermore, the hydrogen sensor can be mounted on the floor tunnel portion such that only the detecting portion of the hydrogen sensor is exposed outside the cabin. Accordingly, the detecting surface of the hydrogen sensor can be located at generally the same height level as the uppermost portion of the floor panel, which leads to improved detecting accuracy with respect to hydrogen present close to an upper surface of the floor panel.

Furthermore, since the hydrogen sensor is mounted from inside the cabin, the hydrogen sensor can be independently removed and mounted apart from the fuel cell system installed outside the cabin. Such a structure can prevent the fuel cell system from hindering the work of removing and mounting the hydrogen sensor, thus facilitating the work of removing and mounting the hydrogen sensor and reducing the burden of labor operation.

Thus, the present invention provides higher layout designing freedom, prevents degradation of detecting accuracy, and allows easy removal and mounting of the hydrogen sensor.

DETAILED DESCRIPTION OF THE INVENTION

Hereinafter, an embodiment of a hydrogen sensor mounting structure for a fuel cell vehicle according to the present invention will be described, referring to the accompanying drawings.

Figure 1:
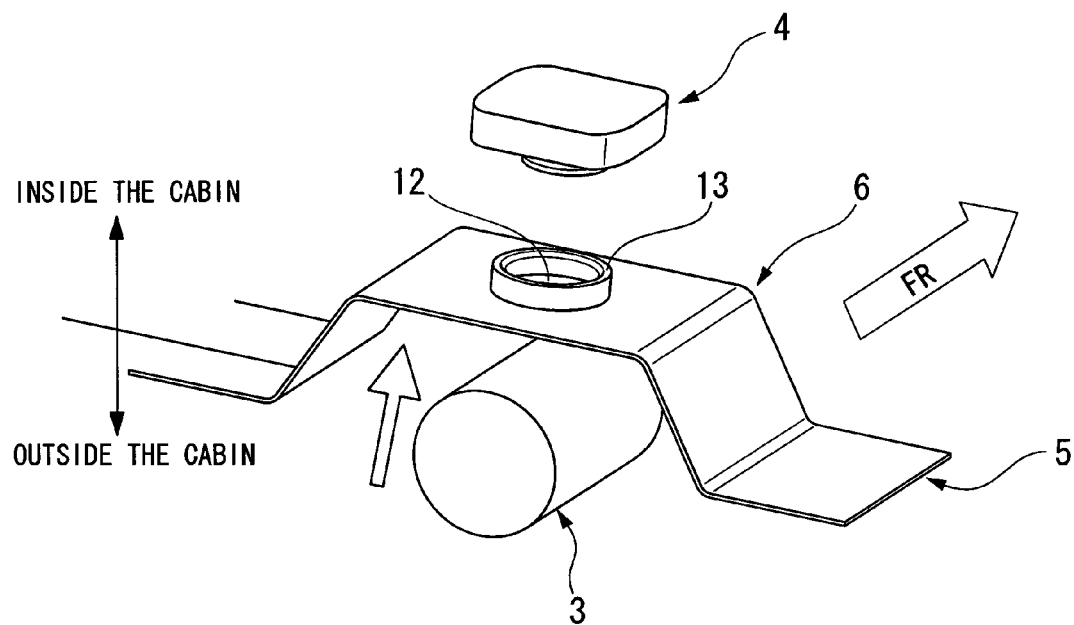
FIG. 1 is an exploded perspective view showing a hydrogen sensor mounting structure according to an embodiment of the present invention.
Figure 2:
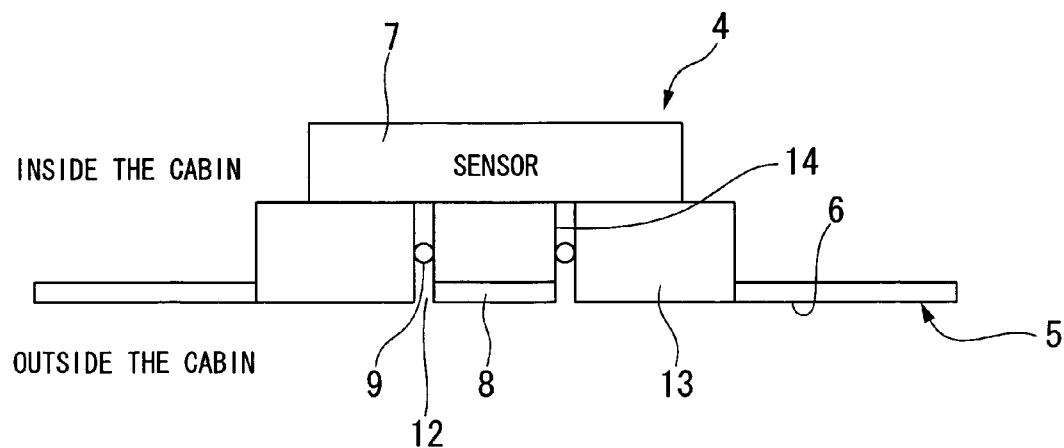
FIG. 2 is a cross-sectional view taken along the line A-A of FIG. 4, showing the hydrogen sensor mounting structure according to the embodiment of the present invention.
Figure 4:
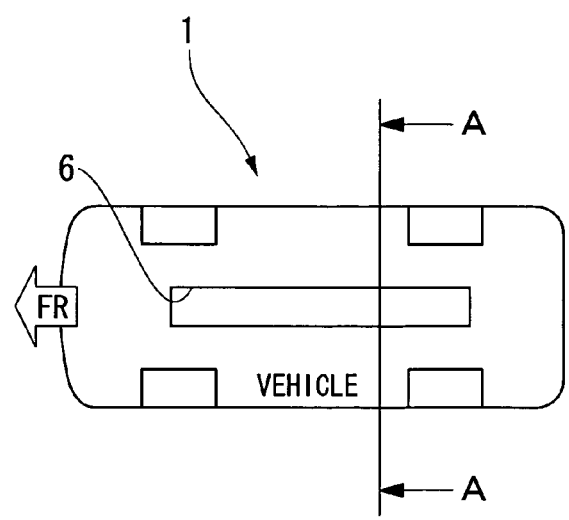
FIG. 4 is a bottom view showing a fuel cell vehicle to which the hydrogen sensor is attached.
Figure 5:
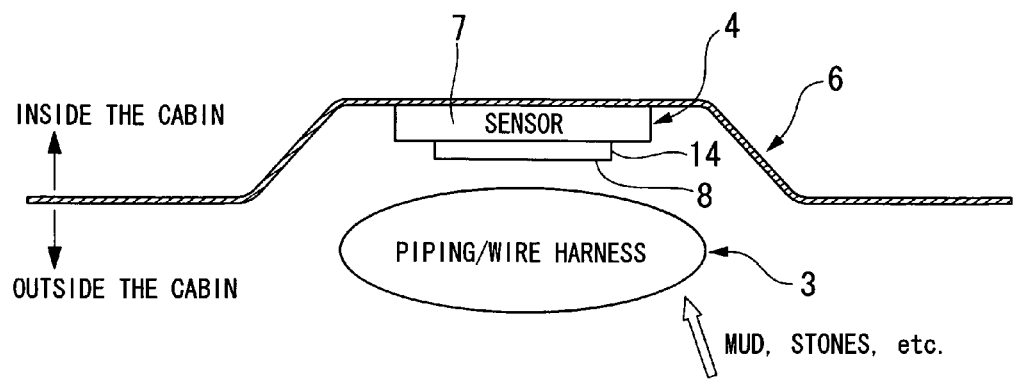
FIG. 5 is a cross-sectional view taken along the line A-A of FIG. 4, showing a conventional hydrogen sensor mounting structure.
Figure 6:
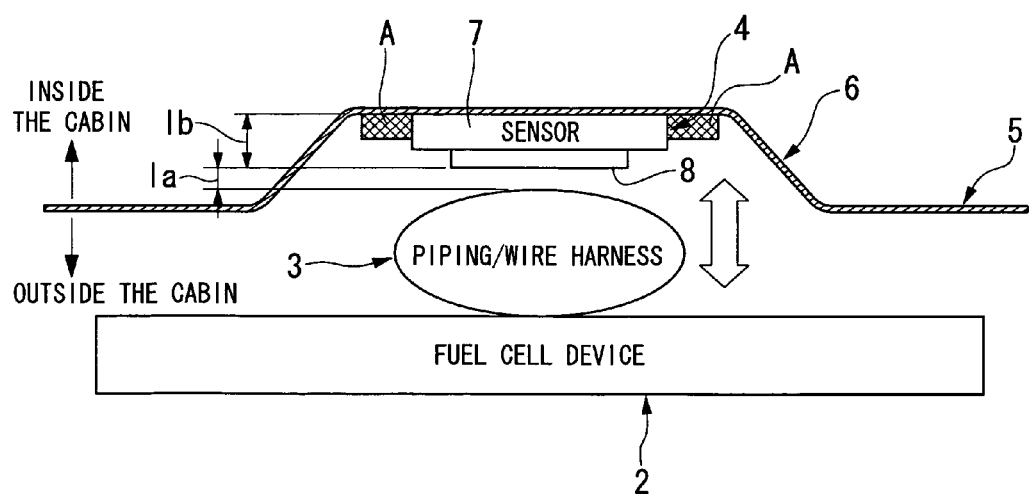
FIG. 6 is a cross-sectional view taken along the line A-A of FIG. 4, showing a problem in the conventional hydrogen sensor mounting structure.

FIG. 1 is an exploded perspective view showing a hydrogen sensor mounting structure for a fuel cell automobile (fuel cell vehicle) according to the embodiment of the present invention. FIG. 2 is a cross-sectional view taken along the line A-A of FIG. 4, showing the hydrogen sensor mounting structure according to the embodiment.

In the fuel cell vehicle, a fuel cell system including a fuel cell device 2 and piping/wire harness 3 is installed. The fuel cell device 2 includes a polymer electrolyte membrane fuel cell, a hydrogen tank for storing hydrogen which serves as the fuel gas, an air compressor that supplies air serving as the oxidant gas, a regulator for adjusting the pressure of the fuel gas, an ejector that recycles the fuel gas, and so on. The piping/wire harness 3 includes a fluid path through which hydrogen or air flows to and from the fuel cell, wires for communicating signals from an ECU (electronic control unit), and so forth.

The hydrogen sensor 4 includes a sensor main body 7 of a generally rectangular cylindrical shape with chamfered corners, and a cylindrical-shaped projection 14 of a smaller diameter than the main body, projecting from the sensor main body 7. On a surface of a forward end portion of the projection 14, a hydrogen detecting element is provided (such surface will be referred to as detecting surface 8).

In this embodiment, the hydrogen sensor 4 is mounted on a center tunnel 6 formed in a central portion of a floor panel 5 of the fuel cell vehicle 1, which is the same configuration as in the conventional art.

In this embodiment, however, the hydrogen sensor 4 is mounted from an inner side of the cabin of the center tunnel 6, which gives rise to a difference from the conventional art. This aspect will be described in detail.

Referring to FIG. 1 and FIG. 2, on the upper surface of the center tunnel 6, an opening 12 is located at a central portion thereof, and a mounting base 13 projecting upward is formed around the opening. Via the mounting base 13, the hydrogen sensor 4 25 is mounted from an upper direction of the center tunnel 6. In other words, the projection 14 of the hydrogen sensor 4 fits in the opening 12 formed in the mounting base 13, such that an upper face of the sensor main body 7 abuts against an upper face of the mounting base 13. The hydrogen sensor 4 is removably fixed to the mounting base 13 with fastening parts not shown in the drawings (such as bolts and nuts). The mounting base 13 has generally the same height as that of the projection 14. As such, the detecting surface 8 on the forward end portion of the hydrogen sensor 4 and an upper surface of the floor panel 5 constituting the center tunnel 6 are generally flush with each other. Between the projection 14 and the mounting base 13, a seal member 9 is provided for sealing the projection 14 along an axis thereof, for securing air-tightness between the inside and outside of the cabin.

As described above, the hydrogen sensor 4 is mounted from the inner side of the cabin of the center tunnel 6, which eliminates the need to take into account the height of the hydrogen sensor 4 itself when designing the height of the center tunnel 6, thereby allowing a reduction in height of the center tunnel 6 and increasing the freedom in layout designing in a vertical space.

In addition, only the detecting surface 8 of the hydrogen sensor 4 is exposed outside the cabin, such that the detecting surface 8 of the hydrogen sensor 4 is located at generally the same height level as the upper surface portion of the floor panel 5, which leads to improved detecting accuracy with respect to hydrogen present close to an upper portion of the floor panel 5 constituting the center tunnel 6.

Furthermore, since the hydrogen sensor 4 is mounted from inside the cabin, the hydrogen sensor 4 can be independently removed and mounted apart from the fuel cell device 2 and the piping/wire harness 3 installed outside the cabin. Such a structure can prevent the fuel cell device 2 and the piping/wire harness 3 from hindering the work of removing and mounting the hydrogen sensor 4, thus facilitating the work of removing and mounting the hydrogen sensor 4 and reducing the labor burden of the operation.

Figure 3:
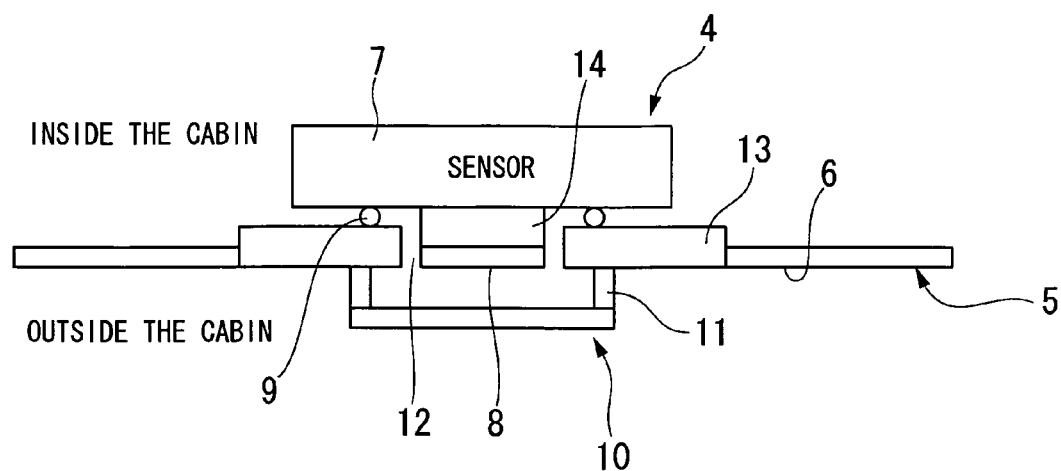
FIG. 3 is a cross-sectional view taken along the line A-A of FIG. 4, showing a variation of the hydrogen sensor mounting structure based on FIG. 2.

Referring now to FIG. 3, a variation of the foregoing embodiment will be described. The variation includes a protection cover 10 attached to a lower face of the mounting base 13 for protection of the detecting surface 8 of the hydrogen sensor 4. The protection cover 10 includes a mesh portion 11 located at a lateral portion thereof, so that a gas can flow in and out via the mesh portion 11, but granular substances such as stones can be blocked from intruding.

Even when the protection cover 10 is provided, it suffices to secure a space for covering only the detecting surface 8 in the center tunnel 6. Such a structure allows significant reduction of the space to be secured, thus increasing the freedom in disposing the hydrogen sensor 4 and the protection cover 10. In addition, in this variation the seal member 9 is interposed between the sensor main-body 7 and the mounting base 13, for sealing to thus secure air-tightness between the inside and outside of the cabin.

Thus, the present invention provides higher layout designing freedom, prevents degradation in detecting accuracy, and allows easy removal and mounting of the hydrogen sensor.

As a matter of course, the present invention is not limited to the foregoing embodiment. For example, while the fuel cell system is installed in the center tunnel formed by bulging a central portion of the floor panel inside the cabin according to the embodiment, the present invention is also applicable to a floor tunnel formed by bulging a different portion of the floor panel inside the cabin. Also, the type of the hydrogen sensor is not specifically limited, and for example, a semiconductor type or a catalytic combustion type may be employed. Furthermore, although the detecting surface 8 provided at the forward end portion of the hydrogen sensor 4 is generally flush with the upper surface of the floor panel 5 constituting the center tunnel 6 according to the embodiment, the detecting surface 8 may be located at an upper position from the upper surface of the floor panel 5.

What is claimed is:

1. A hydrogen sensor mounting structure for a fuel cell vehicle, comprising:
    a fuel cell system installed under a floor panel; and
    a hydrogen sensor located above the fuel cell system, wherein
    the floor panel includes a floor tunnel portion protruding into a cabin of the vehicle, the floor tunnel portion comprising a top wall, the top wall having an opening thereon,
    the fuel cell system is located on an outer side of the cabin of the floor tunnel portion,
    the hydrogen sensor is mounted from an inner side of the cabin of the floor tunnel portion at the opening of the top wall, wherein the hydrogen sensor includes a detecting surface, and the entire detecting surface is located at a level the same as or higher than the top wall of the tunnel portion, and
    the hydrogen sensor is removably mounted from an inner side of the cabin to a mounting base which projects upward and is provided around the opening of the top wall, the opening being formed in the mounting base.

2. The hydrogen sensor mounting structure for the fuel cell vehicle according to claim 1, wherein the hydrogen sensor includes a protection cover that protects the detecting surface.

3. The hydrogen sensor mounting structure for the fuel cell vehicle according to claim 2, wherein the protection cover includes a mesh portion.

4. The hydrogen sensor mounting structure for the fuel cell vehicle according to claim 1, wherein the detecting surface of the hydrogen sensor is exposed outside the cabin through the opening.

5. The hydrogen sensor mounting structure for a fuel cell vehicle according to claim 1, wherein:
    the hydrogen sensor includes a sensor main body, a projection that projects from the sensor main body, and a hydrogen detecting element provided on a surface of a forward end portion of the projection; and
    a seal member is provided between the projection of the hydrogen sensor and the mounting base, the seal member sealing the projection along an axis thereof.

* * * * *